United States Patent
Edwards (10) Patent No.: US 12,485,417 B2
(45) Date of Patent: Dec. 2, 2025

(54) BLISTER ASSEMBLY

(71) Applicant: Binx Health Limited, Trowbridge (GB)

(72) Inventor: Tom Edwards, Salisbury (GB)

(73) Assignee: Binx Health Limited, Trowbridge (GB)

( * ) Notice: Subject to any disclaimer, the term of this patent is extended or adjusted under 35 U.S.C. 154(b) by 885 days.

(21) Appl. No.: 17/734,648

(22) Filed: May 2, 2022

(65) Prior Publication Data
US 2022/0331800 A1 Oct. 20, 2022

Related U.S. Application Data (63) Continuation of application No. 15/547,769, filed as application No. PCT/GB2016/050235 on Feb. 2, 2016, now Pat. No. 11,318,468.

(30) Foreign Application Priority Data

Feb. 2, 2015 (GB) ..................... 1501708

(51) Int. Cl.
*B01L 3/00* (2006.01)
*B01L 99/00* (2010.01)
(Continued)

(52) U.S. Cl.
CPC ... *B01L 3/502738* (2013.01); *B01L 3/502707* (2013.01); *B01L 3/523* (2013.01);
(Continued)

(58) Field of Classification Search
CPC ......... A61F 2013/0296; B32B 2535/00; B32B 38/0004; B32B 7/02; B32B 7/06;
(Continued)

(56) References Cited

U.S. PATENT DOCUMENTS 5,354,668 A 10/1994 Auerbach
5,518,900 A 5/1996 Nikiforov et al.
(Continued)

FOREIGN PATENT DOCUMENTS

EP 3027317 B1 6/2016
EP 3027318 A2 6/2016
(Continued)

OTHER PUBLICATIONS

Canavan, 2010, Combat Ration Network for Technology Impenmentation (CORANET II) Knurled Seal Heat Bar, Aug. 1, 2010, Retrieved from the Internet: http://www.dtic.mil/dtic/tr/fulltext/u2/a530630.pdf.
(Continued)

*Primary Examiner* — Lydia Edwards
(74) *Attorney, Agent, or Firm* — Thomas C. Meyers; Sullivan & Worcester LLP (57) ABSTRACT

A blister assembly comprises at least one collapsible blister adapted, as it is collapsed, to eject a liquid contained therein. The blister assembly comprises a first layer (130) having at least one blister chamber (150) and a second layer (131) sealed to the first layer at least around a periphery of the at least one blister chamber such that a liquid is contained between the first layer and the second layer. The seal between the first and second layers comprises a first planar portion having a first peel strength and a second planar portion having a second peel strength, wherein the first peel strength is greater than the second peel strength, such that when pressure is applied to the blister, the second portion of the seal breaks to release the liquid contained within the chamber into the liquid inlet. The blister assembly further comprises at least one discontinuity (142) formed in the first and second layers in the region of the first portion of the seal,
(Continued)

such that a shear force is required to delaminate the first and second layers in that region.

14 Claims, 5 Drawing Sheets

(51) Int. Cl.

| | | |
|---|---|---|
| B32B 3/26 | (2006.01) | |
| B32B 3/30 | (2006.01) | |
| B32B 5/14 | (2006.01) | |
| B32B 7/05 | (2019.01) | |
| B32B 7/12 | (2006.01) | |
| B32B 15/08 | (2006.01) | |
| B32B 15/20 | (2006.01) | |
| B32B 27/08 | (2006.01) | |
| B32B 27/32 | (2006.01) | |
| B32B 27/36 | (2006.01) | |
| B65B 3/00 | (2006.01) | |
| B65B 9/04 | (2006.01) | |
| B65B 39/00 | (2006.01) | |
| B65B 47/00 | (2006.01) | |
| B65D 5/36 | (2006.01) | |
| B65D 75/36 | (2006.01) | |
| B65B 39/12 | (2006.01) | |
| B65B 47/04 | (2006.01) | |

(52) U.S. Cl.
CPC .............. *B01L 3/527* (2013.01); *B32B 3/266* (2013.01); *B32B 3/30* (2013.01); *B32B 5/142* (2013.01); *B32B 7/05* (2019.01); *B32B 7/12* (2013.01); *B32B 15/08* (2013.01); *B32B 15/20* (2013.01); *B32B 27/08* (2013.01); *B32B 27/32* (2013.01); *B32B 27/36* (2013.01); *B65B 3/003* (2013.01); *B65B 9/042* (2013.01); *B65B 39/007* (2013.01); *B65B 47/00* (2013.01); *B65D 75/367* (2013.01); *B01L 3/502715* (2013.01); *B01L 2200/0689* (2013.01); *B01L 2200/12* (2013.01); *B01L 2300/044* (2013.01); *B01L 2300/0887* (2013.01); *B01L 2400/0683* (2013.01); *B32B 2255/06* (2013.01); *B32B 2255/10* (2013.01); *B32B 2255/26* (2013.01); *B32B 2307/31* (2013.01); *B32B 2307/50* (2013.01); *B32B 2307/582* (2013.01); *B32B 2307/7246* (2013.01); *B32B 2439/80* (2013.01); *B65B 39/12* (2013.01); *B65B 47/04* (2013.01)

(58) Field of Classification Search
CPC ........ B32B 2038/042; B32B 2307/726; B32B 27/06; B32B 37/12; B32B 7/12; B32B 2439/80; B32B 7/05; A61K 9/7038; A61K 9/7084; B01L 2200/0689; B01L 2200/12; B01L 2300/044; B01L 2300/0887; B01L 2400/0683; B01L 3/502707; B01L 3/502715; B01L 3/502738; B01L 3/523; B01L 3/527; B01L 3/502; B01L 3/52
See application file for complete search history.

(56) References Cited

U.S. PATENT DOCUMENTS

| | | |
|---|---|---|
| 5,605,662 A | 2/1997 | Heller et al. |
| 5,899,232 A | 5/1999 | Cardoso et al. |
| 6,045,676 A | 4/2000 | Mathies et al. |
| 6,207,369 B1 | 3/2001 | Wohlstadter et al. |
| 6,211,356 B1 | 4/2001 | Wiessler et al. |
| 6,737,080 B1 | 5/2004 | Schumann |
| 7,087,148 B1 | 8/2006 | Blackburn et al. |
| 10,830,728 B2 | 11/2020 | Marsh et al. |
| 2001/0019845 A1 | 9/2001 | Bienert et al. |
| 2001/0049105 A1 | 12/2001 | Singh et al. |
| 2005/0153430 A1 | 7/2005 | Ohtaka |
| 2007/0292858 A1 | 12/2007 | Chen et al. |
| 2007/0292941 A1 | 12/2007 | Handique et al. |
| 2009/0148933 A1 | 6/2009 | Battrell et al. |
| 2009/0185190 A1 | 7/2009 | Weinberger et al. |
| 2009/0269248 A1 | 10/2009 | Falb et al. |
| 2010/0105029 A1 | 4/2010 | Ririe et al. |
| 2010/0304986 A1 | 12/2010 | Chen et al. |
| 2010/0317093 A1 | 12/2010 | Turewicz et al. |
| 2011/0143339 A1 | 6/2011 | Wisniewski |
| 2012/0107811 A1 | 5/2012 | Kelso et al. |
| 2012/0152369 A1 | 6/2012 | Hiddessen et al. |
| 2012/0312709 A1 | 12/2012 | Kaufman |
| 2013/0157349 A1 | 6/2013 | Ririe et al. |
| 2013/0217103 A1 | 8/2013 | Bauer |
| 2013/0230906 A1 | 9/2013 | Martinelli et al. |
| 2013/0331298 A1 | 12/2013 | Rea |
| 2014/0053952 A1 | 2/2014 | Genosar |
| 2014/0170680 A1 | 6/2014 | Meissonnier et al. |
| 2014/0206074 A1 | 7/2014 | Peterson et al. |
| 2014/0261708 A1 | 9/2014 | Wright et al. |
| 2014/0346071 A1 | 11/2014 | Genosar |
| 2015/0004717 A1 | 1/2015 | Mcdevitt et al. |
| 2015/0346097 A1 | 12/2015 | Battrell et al. |
| 2016/0129437 A1 | 5/2016 | Kayyem et al. |

FOREIGN PATENT DOCUMENTS

| | | |
|---|---|---|
| EP | 3144067 A1 | 3/2017 |
| GB | 2516666 A | 2/2015 |
| GB | 2516667 A | 2/2015 |
| GB | 2516672 A | 2/2015 |
| WO | 9727324 A1 | 7/1997 |
| WO | 0073412 A2 | 12/2000 |
| WO | 03/074731 A2 | 9/2003 |
| WO | 2009123565 A1 | 10/2009 |
| WO | 2010/091246 A2 | 8/2010 |
| WO | 2012/085591 A1 | 6/2012 |
| WO | 2012178166 A1 | 12/2012 |
| WO | 2013/190328 A1 | 12/2013 |
| WO | 2014100725 A1 | 6/2014 |

OTHER PUBLICATIONS

European Examination Report issued in European Application No. 16702798.6, date of mailing: Dec. 23, 2020, 5 pages.
European Examination Report issued in European Application No. 16702799.4, date of mailing: Dec. 23, 2020, 6 pages.
European Examination Report issued in European Application No. 16702797.8, date of mailing: Dec. 18, 2020, 9 pages.
Extended European Search Report issued in European Application No. 22166706.6, date of mailing: Nov. 9, 2022, 15 pages.
Extended European Search Report issued in European Application No. 22166790.0, date of mailing: Nov. 18, 2022, 16 pages.
Great Britain Search Report for Application No. GB 1501704.9 dated Mar. 17, 2016.
Great Britain Search Report for Application No. GB 1501705.6, dated Nov. 22, 2015.
Great Britain Search Report for Application No. GB 1501706.4 dated Nov. 22, 2015, 1 page.
Great Britain Search Report for Application No. GB 1501708.0 dated Jul. 30, 2015.
Hillier, 2004, An electrochemical study of enzymatic oligonucleotide digestion, Bioelectrochemistry, 63(1-2):307-310.
Ihara, 1996, Ferrocene-oligonucleotide conjugates for electrochemical probing of DNA, Nucleic Acids Res, 24 (21):4273-4280.
International Search Report and Written Opinion issued in International Application No. PCT/GB2016/050231, mailed on Jul. 20, 2016, 20 pages.

(56) References Cited

OTHER PUBLICATIONS

International Search Report and Written Opinion issued in International Application No. PCT/GB2016/050234, date of mailing: Apr. 28, 2016, 13 pages.
International Search Report and Written Opinion for Application No. PCT/GB2016/050235 mailed on Apr. 26, 2016. 11 pages.
International Search Report and Written Opinion issued in International Application No. PCT/GB2016/050233, date of mailing: May 3, 2016, 14 pages.
Non-Final Office Action issued in U.S. Appl. No. 17/002,077, date of mailing: May 31, 2022, 24 pages.
Nwaoha, 2012, Pressure Gauge Selection, In Holloway, Process Plant Equipment: Operation, Control and Reliability, published by John Wiley & Sons, Inc., pp. 669-670.
Zhang, 2007, Micropumps, microvalves, and micromixers within PCR microfluidic chips: Advances and trends, Biotechnology Advances, 25(5):483-514.

BLISTER ASSEMBLY

FIELD

The present invention relates an improved blister assembly, and more specifically to improved seals for liquid filled blister assemblies.

BACKGROUND

Blister sub-assemblies or ('blister packs') are well known for storing both liquids and solids. A blister is a collapsible chamber containing a liquid or solid, which may be expelled from the blister by pressing on the blister and thereby collapsing it. In typical blister packs, the chamber of a blister is sealed by a foil or other frangible layer which ruptures once the pressure from inside the chamber reaches a particular magnitude as the blister collapses. One application of liquid filled blisters is for storing liquid reagents on disposable fluidic cartridges.

In recent years, efforts have been made to reduce the scale of analytical systems required to perform diagnostic tests. For instance, laboratory on a chip (LOC) devices have been developed which integrate many of the medical test or diagnostic operations performed in a hospital on a single, micro-fluidic cartridge.

An alternative approach is to use a fluidic cartridge. The scale of the components of a fluidic cartridge is larger than for a microfluidic device, and so it becomes possible to move a sample through various different sites to perform different actions on it. This makes it possible to perform more complex tests than may be conducted using typical LOC devices, whilst still providing an analytical system of potential use in a local GP surgery.

A sample may be introduced into a fluidic cartridge comprising a network of channels and at least some of the necessary components for mixing the sample, moving the sample through the device, reacting the sample with different reagents, etc. The cartridge containing the sample may then be inserted into a reader to control the performance of the test and read the results. The reagents necessary to carry out the test can be included in one or more blisters comprised in the fluidic cartridge. At the appropriate point during the test cycle, the blister is ruptured, manually, or automatically by the reader and the reagents contained in the blister are ejected into network of channels within the fluidic cartridge.

In order to allow the blister to rupture under pressure, a frangible seal is often provided around at least part of a perimeter of the blister cavity, usually in the backing foil. Such frangible seal technologies allow relatively controlled release of reagents, whilst eliminating the need for complex fluid handling systems or external piercing means.

Generally, a frangible sealed blister uses regions of different strengths that are designed to fail under specific pressures. When pressure is applied to the blister, the weakest part of the blister will fail, and the contents of the blister will be ejected into the desired point of the fluidic cartridge. Frangible seals may be created by laser etching the backing layer of a blister pack to create a weakened area which will fail when the blister is collapsed. Alternatively, a weakened section may be created by providing perforations in one or more of the backing layers. When pressure is applied to the blister, the backing foil ruptures, and the contents of the blister is ejected through the tear in the backing foil. One of the problems associated with frangible seals of this kind is ensuring that the backing foil sealing the blisters is strong enough to provide a durable and sterile storage solution for reagents whilst ensuring that the foil reliably fails before the contents of the solution breach the seal between the blister layer and the backing layer.

One solution to avoid weakening the layers of a blister sub-assembly is described in GB2516666 and employs a weakened seal between the first and second layers in place of weakening the layers forming the blister chamber. The seal between the first and second layers making up the blister sub-assembly is provided with a strong seal (or tear seal) in a first region and a weaker seal (or peel seal) in a second region. When pressure is applied to the blister chamber, the weaker portion of the seal fails, and the contents of the blister is ejected from the blister chamber.

Achieving robustness of the tear seal in liquid filled blisters is difficult due to the effectiveness with which the fluid contained within the blister acts to delaminate the first and second layers of the blister sub-assembly at the margin of the seal around the blister chamber. In order to ensure that the seal between the first and second layers fails at the desired location, there must be a sufficient difference between the peel strength of the peel seal and the peel strength of the tear seal, such that the weaker portion of the seal reliably fails before the rest of the seal around the blister.

SUMMARY OF INVENTION

In a first aspect of the invention, there is provided a blister sub-assembly comprising at least one collapsible blister adapted, as it is collapsed, to eject a liquid contained therein; wherein the blister sub-assembly comprises a first layer having at least one blister chamber and a second layer sealed to the first layer at least around a periphery of the at least one blister chamber such that a liquid is contained between the first layer and the second layer; wherein the seal between the first and second layers comprises a first planar portion having a first peel strength and a second planar portion having a second peel strength, wherein the first peel strength is greater than the second peel strength, such that when pressure is applied to the blister, the second portion of the seal breaks to release the liquid contained within the chamber into the liquid inlet; and wherein the blister sub-assembly further comprises at least one discontinuity formed in the first and second layers in the region of the first portion of the seal, such that a shear force is required to delaminate the first and second layers in that region. Providing at least one discontinuity in the seal between the first and second layers, increases the peel strength of the seal between the first layer and the second layer by interrupting the generally planar interface between the first layer 160 and the substrate 131 and providing a region in which a shear force is required to delaminate the layers in that region, rather than purely a peel force.

Preferably, the blister sub-assembly is comprised in a fluidic cartridge for carrying out a diagnostic test on a sample introduced into the cartridge. Preferably, the fluidic cartridge is for carrying out nucleic acid amplification on a liquid sample inserted into the cartridge, and further comprises a network of channels though which a sample moves, at least one amplification chamber and at least one detection chamber.

Preferably, the at least one discontinuity comprises a pimple formed in the first and second layers. Preferably, the at least one discontinuity has a substantially circular footprint. Alternatively the at least one discontinuity may comprise a square footprint, or any other shaped footprint.

Preferably, the at least one discontinuity protrudes from the blister sub-assembly in the same direction as the collapsible blister. This ensures that outer surface of the second layer is substantially flat, thereby reducing the maximum height of the blister sub-assembly and forming a substantially flat surface for application to an adjacent layer in an exemplary cartridge.

Preferably, the blister sub-assembly defines a first plane P, from which the at least one collapsible blister and the at least one discontinuity project, and wherein the profile of the discontinuity comprises first and second side portions and an end portion connecting the first and second side portions.

Preferably, at least a portion of the first and/or second side portions of the discontinuity is aligned radially to the blister. More preferably, at least a portion of the first and/or second side portions is aligned radially and vertically with respect to the blister.

Preferably, at least one of the first and second side portions extend at an angle $\alpha$ from a perpendicular to the plane P, wherein a is less than 30 degrees, and preferably less than 15 degrees and most preferably 0 degrees.

Preferably, the profile of the at least one discontinuity is approximately hemispherical.

Preferably, the profile of the at least one discontinuity has a height H of between 0.1 mm and 1.5 mm, more preferably between 0.2 mm and 1.0 mm, more preferably between 0.3 mm and 0.8 mm, and most preferably approximately 0.5 mm.

Preferably, the profile of the at least one discontinuity has a width W of between approximately 0.5 mm and 3 mm, more preferably between 0.8 mm and 2.5 mm, more preferably between 1 mm and 2.5 mm and most preferably 1.5 mm to 2 mm.

Preferably, the blister-sub assembly comprises a plurality of discontinuities.

Preferably, the plurality of discontinuities are arranged as a dotted or dashed line around at least a portion of the permanent seal. Preferably, a distance D between the centres of each discontinuity is between 1 mm and 4 mm, more preferably between 1.5 mm and 3.5 mm, more preferably between 2 mm and 3 mm and most preferably 2.5 mm.

Preferably, the blister-sub assembly comprises two or more collapsible blisters, wherein the at least one discontinuity is formed between the collapsible blisters.

Preferably, the first layer and the second layer comprise a plastic coated foil. Preferably the plastic coated foil comprises a laminate of polyester, aluminium and polypropylene.

Preferably, at least one of the first seal portion and the second seal portion is formed by heat sealing. Preferably, the first seal is formed at 100° C. Preferably, the second seal is formed at 150° C.

Preferably, the blister sub assembly further comprises at least one fill tube configured to allow filling of the collapsible blisters. Preferably, each blister chamber is in fluid communication with its own fill tube.

Preferably, the blister sub-assembly comprises first, second and third collapsible blisters, and the liquid contained in the first, second and third blisters are liquid reagents necessary for conducting a preferred test on a sample contained within a fluidic cartridge.

Preferably, the reagents are selected from lysis buffer, wash buffer and elution buffer.

In a second aspect of the invention, there is provided a method of manufacturing a blister sub-assembly for containing at least one liquid reagent for use in a diagnostic test carried out on a sample contained with a fluidic cartridge, the method comprising the steps of: forming at least one collapsible blister between a first layer and a second layer, wherein the blister-subassembly comprises a first seal having a first peel strength between the first layer and the second layer over a first portion of the blister sub-assembly and a second seal having a second peel strength between the first layer and the second layer over a second portion of the blister sub-assembly, wherein the first peel strength is greater than the second peel strength, and wherein the second portion is adapted to break when pressure is applied to the collapsible blister thereby eject a liquid contained therein; deforming the first and second layers to form at least one discontinuity in the blister subassembly formed of the first and second layers in a region of the first seal between the first layer and the second layer.

Preferably, the step of forming the at least one collapsible blister comprises the steps of: forming at least one blister chamber in the first layer; applying the second layer over the first layer and applying the second seal between the first layer and the second layer over the second portion of the blister sub-assembly such that the blister chamber is defined between the first layer and the second layer; applying the first seal between the first layer and the second layer over the first portion of the blister sub assembly.

Preferably, the method further comprises the steps of: forming at least one fill tube in the first layer, wherein the at least one fill tube is in fluid communication with the at least one blister chamber; introducing a liquid into the at least one blister chamber via the at least one fill tube; applying a third seal between the first layer and the second layer across the at least one fill tube, thereby sealing the liquid within the at least one collapsible blister.

Optionally, the first portion and the second portion overlap.

Preferably, a plurality of discontinuities are formed in the region of the first seal.

Preferably, the plurality of discontinuities are formed around a periphery of the at least one collapsible blister.

Preferably, the plurality of discontinuities are arranged as a dotted or dashed line around at least a portion of the permanent seal.

Preferably, the at least one discontinuity is hot formed at the same time as the second seal. Alternatively, the at least one continuity may be cold formed after the second seal has been applied.

BRIEF DESCRIPTION OF THE FIGURES

The present invention will now be described with reference to the accompanying drawings, in which.

DETAILED DESCRIPTION

It is envisaged that the blister sub-assembly of the present invention may be included in a fluidic cartridge of the type used to carry out a diagnostic test on a sample introduced in the cartridge. The exemplary fluidic cartridge chosen to illustrate the present invention is adapted for the detection of pathogens using PCR amplification and electrochemical detection. More specifically, it the exemplary fluidic cartridge is adapted for the detection of for the detection of *Chlamydia trachomatis* bacterium. However, the skilled person would understand that the invention is not limited to the exemplary fluidic cartridge and associated methods, and is suitable for use in with various different cartridges for a wide variety of sample analysis techniques or biological assays; for example, assays of target nucleic acid sequences in a liquid sample.

Embodiments of the invention will now be described in the context of the exemplary fluidic cartridge in which the invention is implemented. Whilst not necessary to understand the present invention, it is beneficial to provide general description of the structure and use of the fluidic cartridge and associated methods. Although described in the context of an exemplary blister sub assembly comprised in a fluidic cartridge, a skilled person will recognize that the invention described herein is applicable to any application in which the peel strength of a seal is to be increased.

Those skilled in the art will understand that the devices and methods of the invention described herein and illustrated in the accompanying drawings are non-limiting exemplary embodiments and that the scope of the present invention is defined solely by the claims. The features illustrated or described in connection with one exemplary embodiment may be combined with features of other embodiments. Such modifications and variations are included within the scope of the present disclosures.

Figure 1:
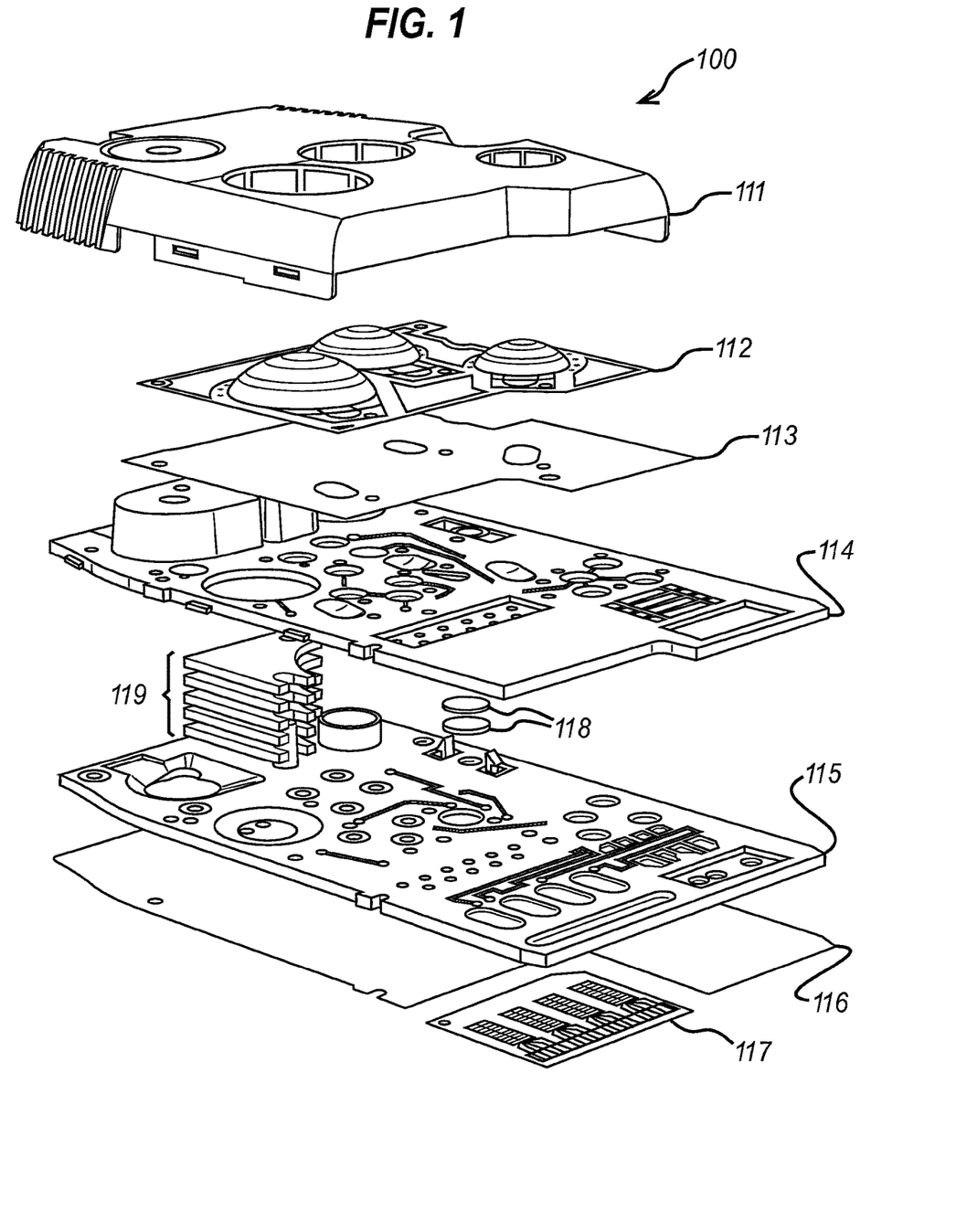
FIG. 1 is an exploded view of an exemplary fluidic cartridge in which the blister sub-assembly of the present invention may be implemented.

FIG. 1 shows an exploded view of an exemplary cartridge in which the present invention may be provided.

The exemplary cartridge shown in FIG. 1 comprises: a fluidic portion 115 through which the sample flows and in which nucleic acid amplification and detection take place; a pneumatic portion 114 which controls flow through the fluidic portion 115; and an electrode layer 117 comprising at least two electrodes which provide a potential difference for the detection of an amplified nucleic acid of interest. The fluidic portion and pneumatic portion may be constructed of a fluidic layer, a fluidic foil, a pneumatic layer and a pneumatic foil such as those described in relation to the exemplary cartridge below. However, the fluidic portion does not necessarily consist only of a fluidic layer and a fluidic foil and the pneumatic portion does not necessarily consist only of a pneumatic layer and a pneumatic foil. Rather, the layers may interact to produce the fluidic portion and the pneumatic portion such that parts of all or some of the layers make up each portion. Rather than referring to the particular layers of the cartridge, the fluidic portion refers to the particular areas of the cartridge which provide the function of allowing controlled sample flow, and the pneumatic portion refers to the particular areas of the cartridge which provide the function of controlling the flow through the fluidic portion.

It is preferred that the cartridge comprises all of the biological agents necessary for conducting the test of choice. For example, the exemplary cartridge is used for detecting the presence, absence or amount of a pathogen of interest. Any pathogen may be detected. Examples of pathogens which may be detected by the cartridge are *Chlamydia trachomatis, Trichomonas vaginalis, Neisseria gonorrhoea, Mycoplasma genitalium* and methicillin resistant *Staphylococcus aureus*. To that end the cartridge comprises reagents for nucleic acid amplification. Nucleic acid amplification may be performed using any nucleic acid amplification method. The nucleic acid amplification method may be a thermocycling method in which the temperature at which the method is performed is varied such that different steps of the amplification are able to take place at different temperatures within the cycle. For example melting, annealing of primers and extension may each be performed at different temperatures. By cycling through the temperatures, the timing of each of the steps of the method can be controlled. As an alternative, the nucleic acid amplification may be an isothermal method in which the temperature is kept constant. In both the thermocycling and the isothermal nucleic acid amplification methods, the temperature is controlled during nucleic acid amplification. Once a test has been run, it is preferred that the cartridge is disposed of. However, if desired, the cartridge may be sent for re-processing to enable it to be used again.

The wet reagents required to carry out a test using the exemplary fluidic cartridge are comprised in a blister sub-assembly according to the present invention. In the exemplary cartridge shown in FIG. 1, the blister sub-assembly 112 comprises three substantially hemispherical collapsible blisters, containing a lysis buffer, wash buffer and an elution buffer. However, a skilled person will understand that the size, shape and number of blisters may be varied according to the specific needs of the application and that the blisters may comprise any required fluid.

Figure 2:
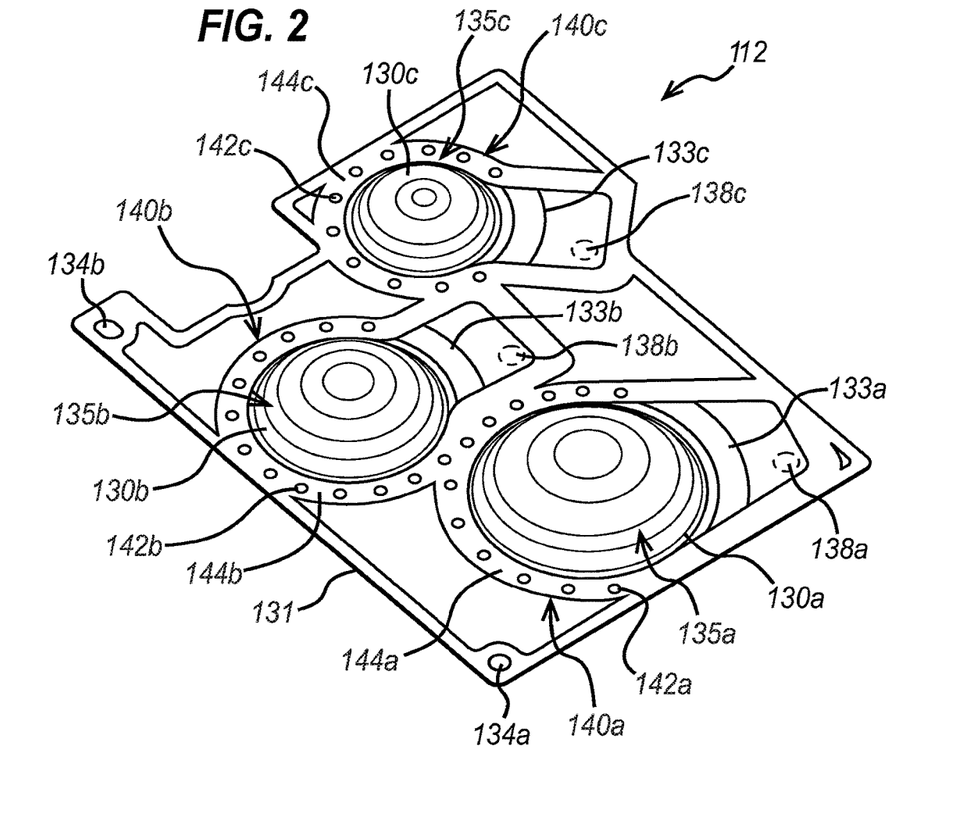
FIG. 2 shows the blister sub-assembly of FIG. 1 in more detail.

FIG. 2 shows the exemplary blister sub-assembly of FIG. 1 in more detail. As shown in FIG. 2, the blister sub-assembly 112 comprises at least one blister cavity 130a-c formed in a first deformable layer. Each blister cavity 130a-c is affixed to a substrate 131 around at least at portion of its periphery, thereby defining a blister chamber 135a-c between the substrate 131 and the first deformable layer. The blister cavity 130a-c may be affixed to the substrate by any suitable means. For example, the deformable layer may be heat-sealed to the substrate, or an adhesive may be applied between the first layer and the substrate.

At least one aperture 138a-c, corresponding to the at least one blister 130a-c, passes through the substrate 131 outside the footprint of the blister chamber 135a-c. The aperture 138a-c is covered by the deformable polymeric layer defining the blister chamber 135a-c, which thereby connects the aperture 138a-c to the chamber 135a-c, but for a first portion 133a-c of the seal 140a-c formed around the periphery of the blister cavity 130a-c. The first portion 133a-c of the seal 140a-c passes between the blister chamber 135a-c and the aperture 138a-c, thereby preventing the contents of the blister from escaping through the aperture 138a-c.

A second portion 144a-c of the seal surrounds the remainder of the blister cavity 135a-c. Together, the first portion 133a-c of the seal and the second portion 144a-c of the seal surround the blister chamber 135a-c such that the fluid contained within the blister chamber 135a-c cannot escape the blister sub-assembly 112. The first portion 133a-c of the seal is weaker than the second portion 144a-c of the seal, by which it is meant that the first portion of the seal has a lesser peel strength than the second portion of the seal.

At least one discontinuity 142a-c is provided in the blister sub-assembly 112 in the second portion 144a-c of the seal around blister chamber 135a-c. In FIG. 2, a series of discontinuities are provided, arranged in a curved line partially surrounding blister chamber 135a-c in the region of the second portion of the seal.

Figure 3:
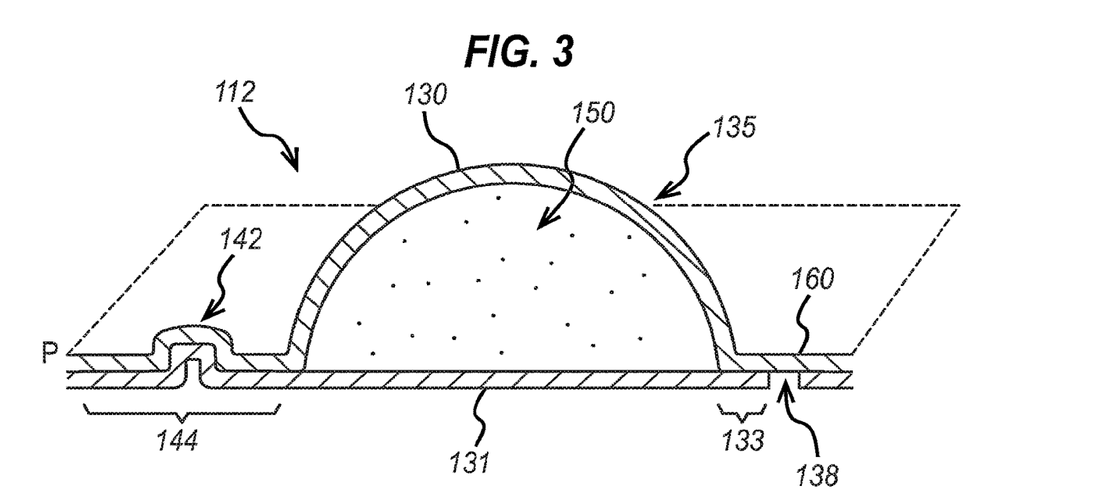
FIG. 3 shows a cross sectional view of the blister sub-assembly of FIG. 2.

FIG. 3 shows a cross-section of the blister sub-assembly shown in FIG. 2. A liquid 150 is contained in the blister chamber 135 defined between the substrate 131 and the first deformable layer 160. As shown in FIG. 3, the discontinuity comprises a raised portion or pimple formed in the first layer 160 and the substrate 131 in the region of the second seal 144. The first layer 160 and the substrate 131 remain laminated and are affixed to each other throughout the discontinuity 142.

In FIG. 3, the discontinuity 142 protrudes from the plane P defined by the blister sub-assembly in substantially the same direction as the blister cavity 130. However, the discontinuity may also protrude from the plane P in a direction opposite the direction of the blister cavity 130.

Typically, the at least one discontinuity is between 1 and 5 mm from the edge of the blister chamber 135. In the exemplary cartridge described herein, the at least one discontinuity is 2 mm from the edge of the blister chamber. The distance between the centres of the adjacent discontinuities in accordance with the present invention is preferably between 2.5 mm and 10 mm, and ideally approximately 4 mm. However, a skilled person will recognise that the distance between the centres of adjacent discontinuities will vary with the size of the discontinuity and the space constraints of a particular blister sub-assembly.

FIGS. 4A-D show possible profiles of a discontinuity 142 in accordance with the present invention. In each case, discontinuity 142 comprises a profile having first side portion 170, a second side portion 172, and a top portion 174 connecting the first and second side portions. As shown in FIGS. 4A-D, the first and second side portions may be connected by a substantially linear end portion, or they may be connected by a generally curved portion.

Figure 4A:
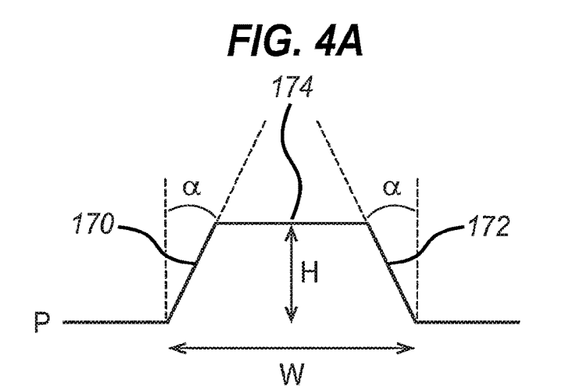
FIGS. 4A-D show possible profiles of a discontinuity of a blister sub-assembly in accordance with the present invention.
Figure 4B:
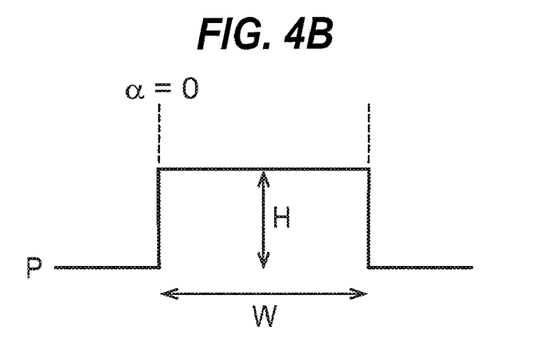
Figure 4C:
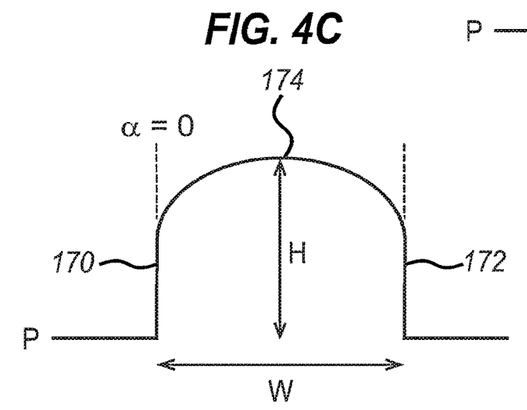
Figure 4D:
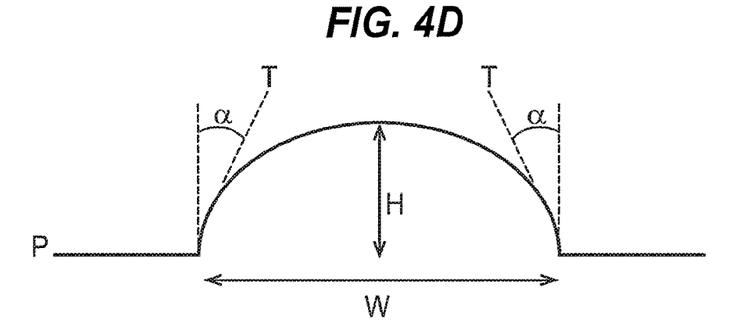

As shown in FIGS. 4A-D, first and second side portions 170, 172 extend from the plane P defined by the blister sub assembly at angle α from a perpendicular to plane P. Typically, a is between 0 degrees and 45 degrees. Preferably, a is less than 30 degrees and most preferably, α is approximately 0 degrees. Where the profile of the at least one discontinuity is substantially hemispherical as shown in FIGS. 4C and 4D, the angle α is defined between a perpendicular to the plan P and a tangent T to the discontinuity at a point where discontinuity meets the plane P.

The typical height H of a discontinuity in accordance with the present invention is between 0.2 mm and 1.5 mm. Preferably, height H is greater than or equal to 0.5 mm. The typical width W of a discontinuity is between 0.5 mm and 3 mm. The foot print of the discontinuity may be any shape. For example, the footprint of the discontinuity may be substantially circular or substantially rectangular or any other shape. In any case, at least a portion of the first and/or second side portions 170, 172 of the discontinuity is preferably aligned vertically and radially to the blister.

Referring again to FIG. 3, in order to eject the contents of the blister chamber 135a-c from the blister sub-assembly 112 and into the fluidic layer of the exemplary cartridge, blister cavity 130 is collapsed. A suitable pressure is applied, manually or mechanically to an outer surface of blister cavity 130a-c. Upon application of a suitable pressure, the pressure of the fluid within the blister increases, and causes a force to be exerted on the internal surfaces of the blister, which act to peel the seal between the first layer 160 and the substrate 131.

Since the peel strength of the second portion of the seal is greater than the first portion of the seal, the first portion of the seal fails first and the contents of the blister escapes through the breached seal, between the first layer and the substrate, and is ejected from blister sub-assembly 112 through the aperture 131.

The at least one discontinuity 142 increases the peel strength of the seal between the first layer and the substrate by interrupting the generally planar interface between the first layer 160 and the substrate 131 and providing a region in which a shear force is required to delaminate the layers in that region, rather than purely a peel force.

An exemplary method for producing a blister sub-assembly in accordance with the present invention will now be described with reference to FIG. 5 and FIG. 6.

A first step in producing an exemplary blister sub assembly in accordance with the present invention comprises forming at least one blister cavity 230 in a first deformable layer 260. The at least one blister cavity 230 may be cold formed in a first deformable polymeric layer 160, although a skilled person will be aware of other suitable materials and/or methods of forming a blister cavity in a first layer.

Figure 6:
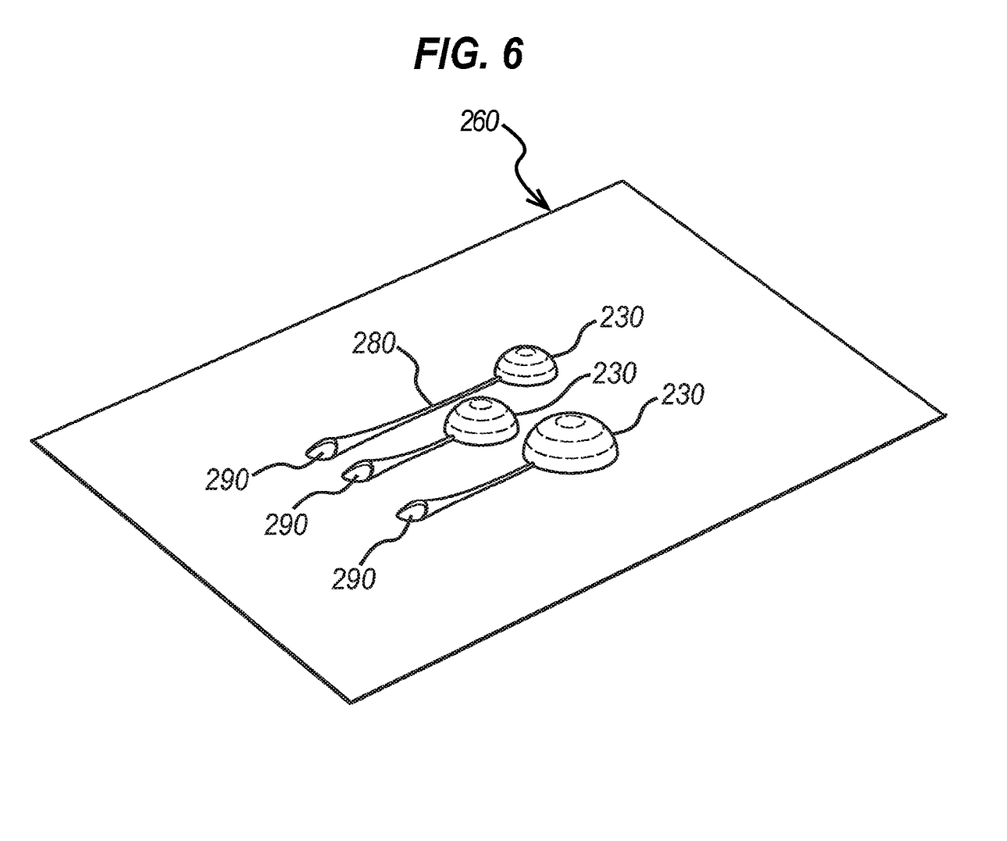
FIG. 6 shows an exemplary first layer of a blister sub-assembly.

As shown in FIG. 6, at least one fill channel 280 is formed in the first deformable layer 260. The fill channel 280 may be straight or curved and connects the blister cavity 230 to an aperture 290 formed in the first layer.

Figure 5:
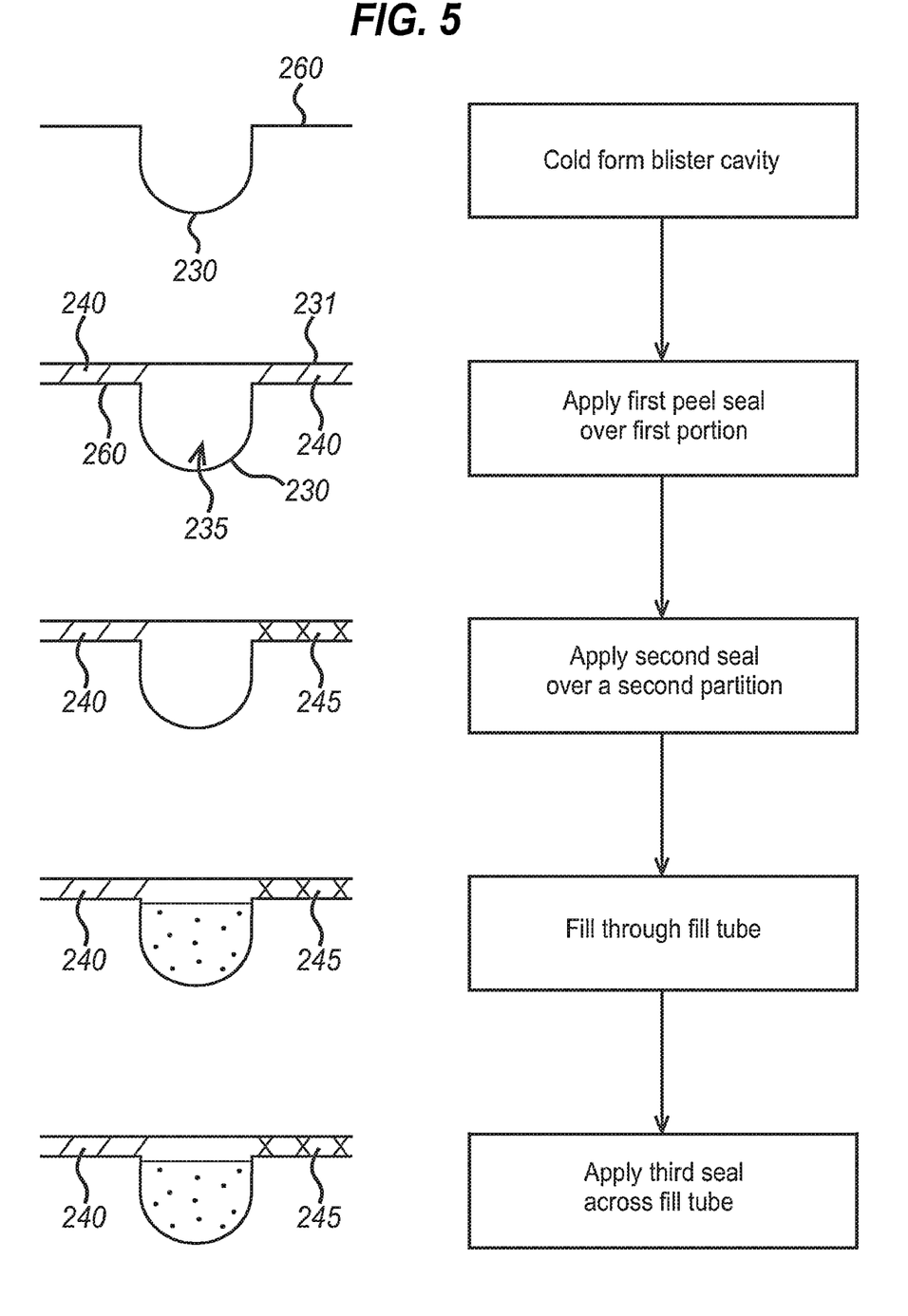
FIG. 5 is a schematic diagram of the steps of an exemplary method of making a blister sub assembly in accordance with the present invention.

Referring now to FIG. 5, a second layer or substrate 231 is applied to the first layer 260. The first layer 260 and the second layer 231 are sealed to each other to define a blister chamber 235 between the blister chamber and the second layer 231 and a fill tube (not shown) between the fill channel 280 and the second layer. Typically, the first layer 260 is heat-sealed to the second layer 231, at around 100° C., to form a peel seal 240. A skilled person will understand that this temperature may be varied in order to achieve a peel seal in a variety of circumstances.

A second tear seal 245 is formed between the first layer and the second around at least a portion of the blister chamber. Typically, the first and second layers are heated to approximately 150° C. to form the second tear seal. The blister chamber 235 is filled through fill tube (not shown) and the fill tube is sealed with a final robust seal.

At least one discontinuity is formed in the first and second layers following the application of the tear seal, in the region of the tear seal. Typically, the at least one discontinuity is formed during at the same time as the tear seal, as a pimple or raised bump in the region of the tear seal after the blister sub assembly has been filled. However, a skilled person will understand that the discontinuity may be formed before filling or by other techniques such as cold-forming after the tear seal has been applied.

Preferably, at least one of the first layer and the substrate comprises a laminate of polyester, aluminium and polypropylene. The polyester is provided to increase the stiffness of the blister sub-assembly, whilst the aluminium acts as a vapour barrier. The polypropylene is provided on the facing surface of the layer for bonding. In order to create the peel seal, the first layer and the substrate are pressed together under pressure at approximately 100° C., for approximately 1 s. To create the tear seal, the layers are pressed together under pressure at approximately 150° C. for approximately 1 s. However, a skilled person will understand that other materials may be used for the first layer and the substrate and that the temperatures and press durations used to form the peel seal and the tear seal between the two may be varied accordingly.

It should be recognised that other arrangements configurations and methods should be readily apparent to a person of ordinary skill in the art. For example, although exemplary blister sub-assembly comprises three collapsible blisters, it will be understood that a blister sub-assembly comprising multiple blisters may be provided. This may be achieves by forming multiple blisters cavities in a single deformable polymeric sheet affixed or by forming a single blister cavity in multiple polymeric sheets applied to a single substrate.

Additionally, it is envisaged that the first layer in which the blister cavity is formed may comprise one layer or multiple layers. Similarly, the substrate sealing the blister chamber may comprise one layer or multiple layers.

Although typical values for the size and shape of exemplary discontinuities is outlined above, a skilled person will appreciate that the size, shape and configuration of discontinuities may be varied in order to provide an improved seal in a variety of fluid filled blister packages. For example, the height and width of a discontinuity may need to be increased according to the thickness of the first and second layers. Similarly, the spacing between the discontinuities may be reduced for smaller discontinuities and increased for larger discontinuities, as required.

In the exemplary blister sub-assembly descried above, the blister cavity has a substantially circular footprint and a substantially hemispherical profile. However, it will be appreciated that the blisters may be sized shaped according to the specific needs of the application. For example, blisters may comprise a square, oval or lozenge-shaped footprint or a rectangular profile.

The exemplary blister sub-assembly described above comprises a seal between two layers, wherein one portion of the seal is designed to fail before another portion of the seal. However, the skilled person will understand that the present invention may be applied to blister sub-assemblies comprising different frangible seal types. For example, the present invention may be applied to a blister-sub assembly wherein a foil sealing the blister is designed to break to release the contents of the blister by placing at least one discontinuity in the region if the seal around the blister chamber.

Furthermore, it should be understood that various alternatives to the embodiments of the invention described above can be employed in practicing the invention. It is intended that the following claims define the scope of the invention and that methods and structures within the scope of these claims and their equivalents be covered thereby.

What is claimed is:

1. A method of manufacturing a blister assembly, the method comprising:
   forming at least one collapsible blister between a first layer and a second layer, wherein the blister assembly comprises a first seal having a first peel strength between the first layer and the second layer over a first portion of the blister assembly and a second seal having a second peel strength between the first layer and the second layer over a second portion of the blister assembly, wherein the first peel strength is greater than the second peel strength, such that when pressure is applied to the blister, the second portion of the seal breaks to release contents from the blister;
   deforming the first and second layers to form at least one discontinuity comprising a pimple formed in the first and second layers in a region of the second portion of the seal.

2. The method of claim 1, wherein the step of forming at least one collapsible blister comprises:
   forming at least one blister chamber in the first layer;
   applying the second layer over the first layer and applying the second seal between the first layer and the second layer over the second portion of the blister assembly such that the blister chamber is defined between the first layer and the second layer;
   applying the first seal between the first layer and the second layer over the first portion of the blister assembly.

3. The method of claim 1, further comprising:
   forming at least one fill tube in the first layer wherein the at least one fill tube is in fluid communication with the blister chamber;
   introducing a liquid into the blister chamber through the fill tube;
   applying a third seal between the first layer and the second layer across the fill tube, thereby sealing the liquid within the collapsible blister.

4. The method of claim 1, wherein the first portion and the second portion at least partially overlap.

5. The method of claim 1, wherein the first and second layers remain sealed to each other throughout the at least one discontinuity such that a shear force is required to delaminate the first and second layers in said region of the second portion of the seal, causing the second peel strength to be greater than the first peel strength.

6. The method of claim 1, wherein the at least one discontinuity is formed around the periphery of the collapsible blister.

7. The method of claim 1, wherein the at least one discontinuity protrudes from the blister assembly in the same direction as the collapsible blister.

8. The method of claim 1, wherein the at least one discontinuity is hot formed in the same step as the second seal.

9. The method of claim 1, wherein at least a portion of first and/or second side portions of the at least one discontinuity is aligned radially to the blister.

10. The method of claim 1, wherein profile of the at least one discontinuity is approximately hemispherical.

11. The method of claim 1, wherein the first layer and the second layer are heated to 150° C. to form the second seal.

12. The method of claim 3, wherein the at least one discontinuity is formed before filling the liquid in the blister by cold-forming.

13. The method of claim 1, wherein the first layer comprises a deformable polymeric layer, and a blister cavity may be cold formed in the deformable polymeric layer.

14. The method of claim 1, wherein the first layer is heat-sealed to the second layer at a temperature of about 100° C.

* * * * *